US006798715B2

(12) United States Patent
Harmon et al.

(10) Patent No.: US 6,798,715 B2
(45) Date of Patent: Sep. 28, 2004

(54) BIOMIMETIC SONAR SYSTEM AND METHOD

(75) Inventors: John B. Harmon, Waimanalo, HI (US); Whitlow Au, Kailua, HI (US); Paul Eugene Nachtigall, Kailua, HI (US); Herbert Lawrence Roitblat, Ventura, CA (US)

(73) Assignee: Neptune Technologies, Inc., Honolulu, HI (US)

(*) Notice: Subject to any disclaimer, the term of this patent is extended or adjusted under 35 U.S.C. 154(b) by 244 days.

(21) Appl. No.: 09/901,751

(22) Filed: Jul. 9, 2001

(65) Prior Publication Data

US 2004/0165478 A1 Aug. 26, 2004

Related U.S. Application Data

(60) Provisional application No. 60/217,150, filed on Jul. 8, 2000.

(51) Int. Cl.[7] .............................................. G01S 15/89
(52) U.S. Cl. .......................................... 367/99; 367/11
(58) Field of Search ............................... 367/99, 88, 11, 367/101, 131

(56) References Cited

PUBLICATIONS

Tyack, P.L.; Williams, W.J.; Cunningham, G.; Time–frequency fine structure of dolphin whistles; Time–Frequency and Time–Sca Analysis, 1992., Proceedings of the IEEE–SP International Symposium , Oct. 4–6, 1992; pp.: 17–20.*

Houser, D.S.; Helweg, D.A.; Chellapilla, K.; Moore,P.W.B-.;Creation of a biomimetic model of dolphin hearing through the us o Evolutionary Computation, 1999. CEC 99. Proceedings of the 1999 Congress on , vol.: 1 , 1999; pp.: 496–502.*

Dubrovsky et al.; A simulation network of first order auditory neurons for preprocessing of acoustic signals; OCEANS '94.Oceans Engineering for Today's Technology and Tomorrow's Preservation.'Proceedings , vol.: 2, Sep. 13–16, 1994; pp.: II/235–II/238.*

Kuc, R.; Fusing binaural sonar information for object recognition Multisensor Fusion and Integration for Intelligent; Systems, 1996. IEEE/SICE/RSJ International Conference on , Dec. 8–11, 1996; pp.: 727–735.*

Roitblat et al.; Dolphin echolocation: identification of returning echoes using a counterpropagation network; Neural Networks, 1989. IJCNN., International Joint Conference on , Jun. 18–22, 1989; pp.: 295–300.*

Nachtigall, P.E.; Au, W.W.L.; Pawloski, J.L.; Roitblat, H.L.; Animal echolocation and signal processing; OCEANS '94. Oceans Engineering for Today's Technology and Tomorrow's Preservation.; Proceedings , vol.: 1 , Sep. 13–16, 1994; pp.: I/259–I/263.*

* cited by examiner

*Primary Examiner*—Daniel Pihulic
(74) *Attorney, Agent, or Firm*—Paradise Patent Services, Inc.; George E. Darby (57) ABSTRACT

The Biomimetic Sonar invention ensonifies submerged objects, digitizes acoustic images reflected from the ensonified objects, and classifies and stores the digitized images using electronic processing derived from that believed to be used by *Tursiops truncatus*, the bottlenose dolphin. The invention also provides a probable identification of an ensonified object based on comparison of an ensonified object with templates in a library of acoustic images.

41 Claims, 9 Drawing Sheets

BIOMIMETIC SONAR SYSTEM AND METHOD

RELATED APPLICATION

This application claims the benefit of the provisional patent application, Ser. No. 60/217,150 filed on Jul. 8, 2000, in the U.S. Patent and Trademark Office for an invention entitled "Biomimetic Sonar Method and System".

BACKGROUND OF THE INVENTION

1. Field of the Invention

Dolphins possess a keen sonar capability that allows them to detect and discriminate targets in highly cluttered and noisy environments. Their biosonar abilities far exceed those of any man-made sonar to detect and discriminate targets in shallow waters typical of coastal and estuary environments. One outstanding example of the dolphin's keen sonar capabilities is its ability to detect small fish and eels buried 30–45 cm beneath the sandy seabed in the sand banks of the Bahamas.

2. Description of Related Art

The related art is primarily the U.S. Navy's "MK-7 Marine Mammal System", which is a mine-hunting system to detect and classify mines buried in the ocean bottom. The MK-7 system relies on trained Atlantic bottlenose dolphins, *Tursiops truncatus* ("dolphin"). Man-made sonars developed to date typically cannot detect, discriminate, and classify shallow water mines buried in the ocean bottom. The dolphin's scanning capabilities coupled with their apparently good auditory spatial memory provide considerably more information to a dolphin than can be achieved with traditional, man-made sonar systems. Auditory processing used by dolphins appears to be well suited for analyzing broadband, high frequency echoes.

There is no hull-mounted, swimmer-held, remotely operated vehicle-mounted, or autonomous underwater vehicle sonar that can discriminate and recognize targets, including without limitation mines and other armaments, that are buried in ocean sediment or veiled by turbid water.

SUMMARY OF THE INVENTION

The Biomimetic Sonar invention ensonifies submerged objects, digitizes acoustic images reflected from the ensonified objects, and classifies and stores the digitized images using electronic processing patterned on that believed to be used by *Tursiops truncatus*. The waveform, spectrum, and binaural processing of the dolphin echolocation system appear to be extremely important to the unique capabilities of the dolphin's "biosonar".

A target that is ensonified with a broadband pulsed signal such as a dolphin-like (i.e., biomimetic) sonar signal will have unique time-frequency characteristics, or "highlights". The same target will generate different time-frequency characteristics when ensonified from different aspects. Such time-frequency characteristics are independent of the distance of the sonar from the target, assuming a sufficiently high signal-to-noise ratio. Therefore, multiple, related time-frequency characteristics of a specific target can be obtained by ensonifying that target from a plurality of different aspects. The signal in each receive channel in the Biomimetic Sonar will have slightly different time-frequency characteristics, providing more information and a better characterization of a target as to surface texture, structural relationships, thickness, etc. Sets of echo characteristics, called acoustic images, of known objects are collected as "object templates" in an object template library. The object templates are used to identify unknown ensonified objects by comparison of object templates with the acoustic images of an unknown object The inventive step in the Biomimetic Sonar system lies in complex auditory processing, including the emulation of the displacement by acoustic energy of the basilar membrane in the dolphin cochlea, the generation of auditory neural network signals corresponding to echoes from objects in the ensonified space, the creation of two- and three-dimensional acoustic images based on those neural signals, classification of those acoustic images, comparison of those acoustic images with object templates stored in an object template library, and providing a probable identification of an ensonified object based on that comparison.

The Biomimetic Sonar can not only recognize and identify targets on the ocean floor, it can recognize and identify shallowly buried targets, targets in turbid water, and can discriminate mine-like targets from coral heads, oil drums, and other debris on the ocean bottom. In some cases, the Biomimetic Sonar can recognize and identify specific types of mines.

DETAILED DESCRIPTION OF THE PREFERRED EMBODIMENTS

The Biomimetic Sonar invention emulates the echolocation, auditory processing, and acoustic image retrieval capabilities of the bottlenose dolphin, *Tursiops truncatus*, to detect, discriminate, and classify underwater objects. The preferred embodiment of the Biomimetic Sonar invention is a portable unit that can be carried by a diver, or placed on a small underwater vehicle, either remotely controlled or autonomous. The improvements provided by the Biomimetic Sonar system and method arise from generating, receiving, and processing a broadband, dolphin-like ("biomimetic") waveform; movement of a Biomimetic Sonar device to collect echolocation data from different directions and aspects; processing two or more channels of echolocation information binaurally or multi-aurally; a powerful neural network discrimination algorithm for acoustic processing, coupled with cochlear, envelope, shape from latency, stereausis, and object recognition processors, a library of acoustic image templates and an image comparator; and generation of human- and computer-usable imagery and data about known and unknown ensonified objects.

Figure 1:
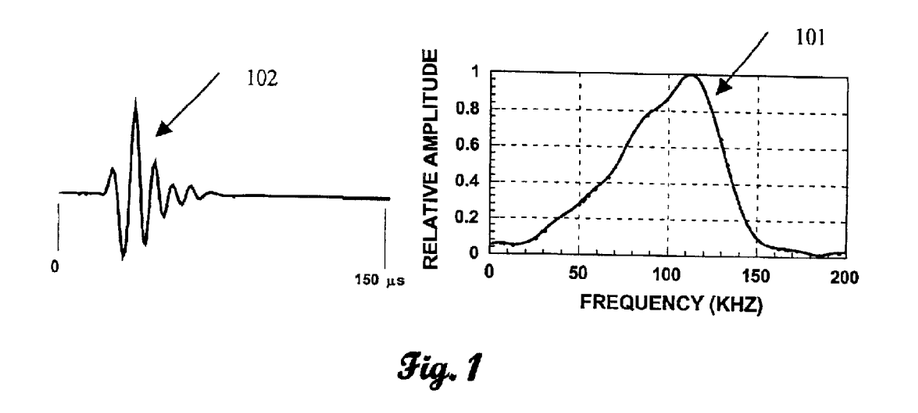
FIG. 1 illustrates the waveform and spectrum of dolphin echolocation pulses.

As shown in FIG. 1, dolphin-generated pulses have peak frequencies between 40–130 kHz (101), with a 3-dB bandwidth of 30–45 kHz and duration of 40–70 $\mu$s (102). Biomimesis of dolphin echolocation targets three properties. First, dolphins project broadband, short duration pulses that have certain temporal and frequency resolution properties. Such signals have a temporal resolution of the order of 14–15 $\mu$s. Second, dolphins have a binaural receiving system with two independent, but coupled, ears. Each ear's "receive channel" can contain different information that can be fused together to process echoes from objects having complex echo structures. Third, the dolphin is a highly mobile sonar platform that can scan targets from different positions, allowing it to obtain multiple aspects of a target and, therefore, more information on the characteristics of a target.

Figure 2:
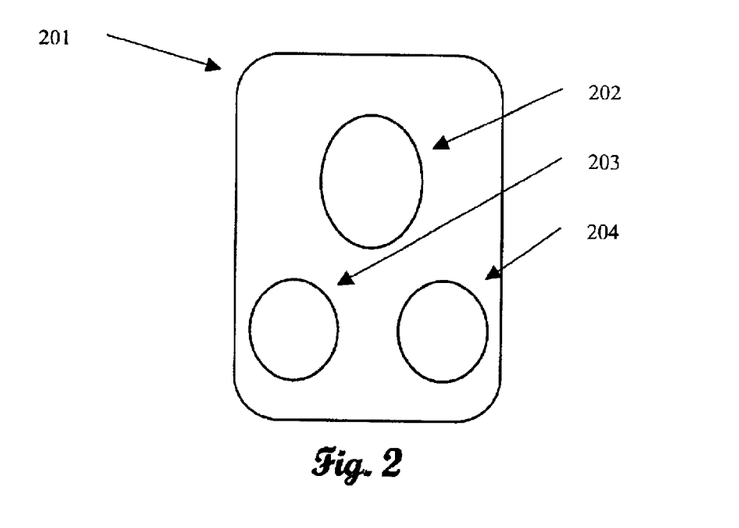
FIG. 2 illustrates a front elevation of the Biomimetic Sonar device.

As shown in FIG. 2, the Biomimetic Sonar device (201) has a transmitter (202) that projects broadband, high-frequency, short-duration dolphin-like sonar signals. The Biomimetic Sonar also has two receiving hydrophones (203, 204) with center to center separation of approximately 13 cm, about the same distance between the auditory bullas of a bottlenose dolphin. The transmitter is positioned above, and on the midline between, the receiving hydrophones, in a manner similar to the projector, or sound source, and auditory bullas of a bottlenose dolphin. Transmitter and receiver electronics are connected to the transmitting and receiving hydrophones and mounted in a watertight case attached to the front panel of the Biomimetic Sonar device (201). An acoustic image processing computer system can be mounted within the same case or can be interfaced through a transmission path (e.g., fiber optic or metallic cable) to a separate computer system. A power supply for the electronics in Biomimetic Sonar device is normally mounted within the case, but can be cabled to the case from a separate power source.

The projector of a dolphin is located in the top portion of the animal's head. There are a pair of lips, referred to as phonic lips, that are within the nasal system of the animal, about 2 to 3 cm below the blow hole. Sounds are produced by air being pushed past the phonic lips. The dolphin's "transmit" acoustic energy propagates through the dolphin's melon into the water. The receivers of a dolphin are located in the lower jaw. There are several locations on the lower jaw through which sounds (including reflections from submerged objects of the acoustic energy transmitted by the dolphin, i.e., echoes) enter, propagate, and eventually reach the inner ears of the dolphin.

Figure 3:
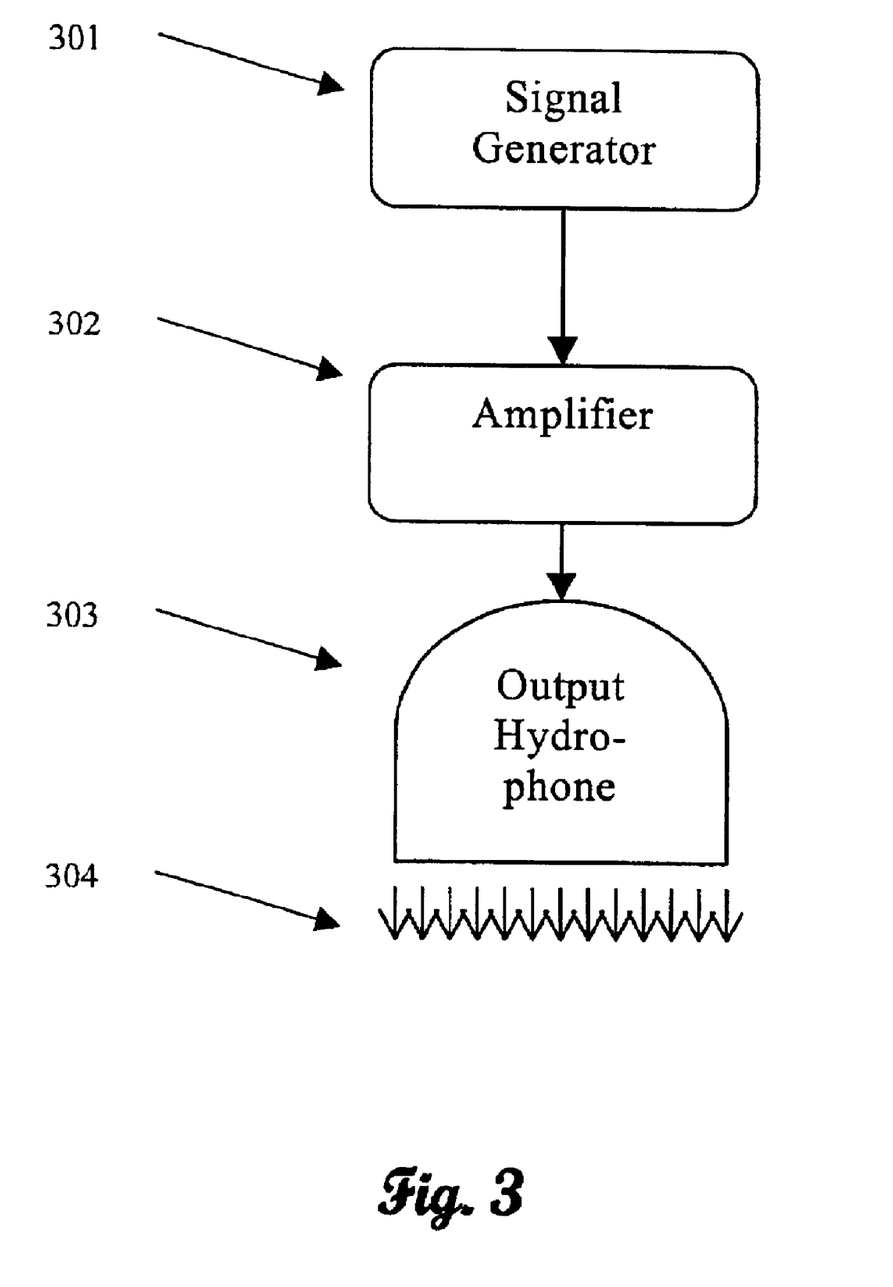
FIG. 3 illustrates the transmit path in the Biomimetic Sonar device.

As shown in FIG. 3, a biomimetic signal generator 301) generates precisely the modulation and waveforms of the dolphin projector. The generated signal is amplified by an amplifier (302) and radiated at an output hydrophone (303), or transmitter, as acoustic energy (304). The water/eardrum interface of the auditory bullas, and "transmission channel" from the projector through the melon, in the dolphin differ significantly from those in the Biomimetic Sonar, but these physical differences are not material to the operation of the invention.

Figure 4:
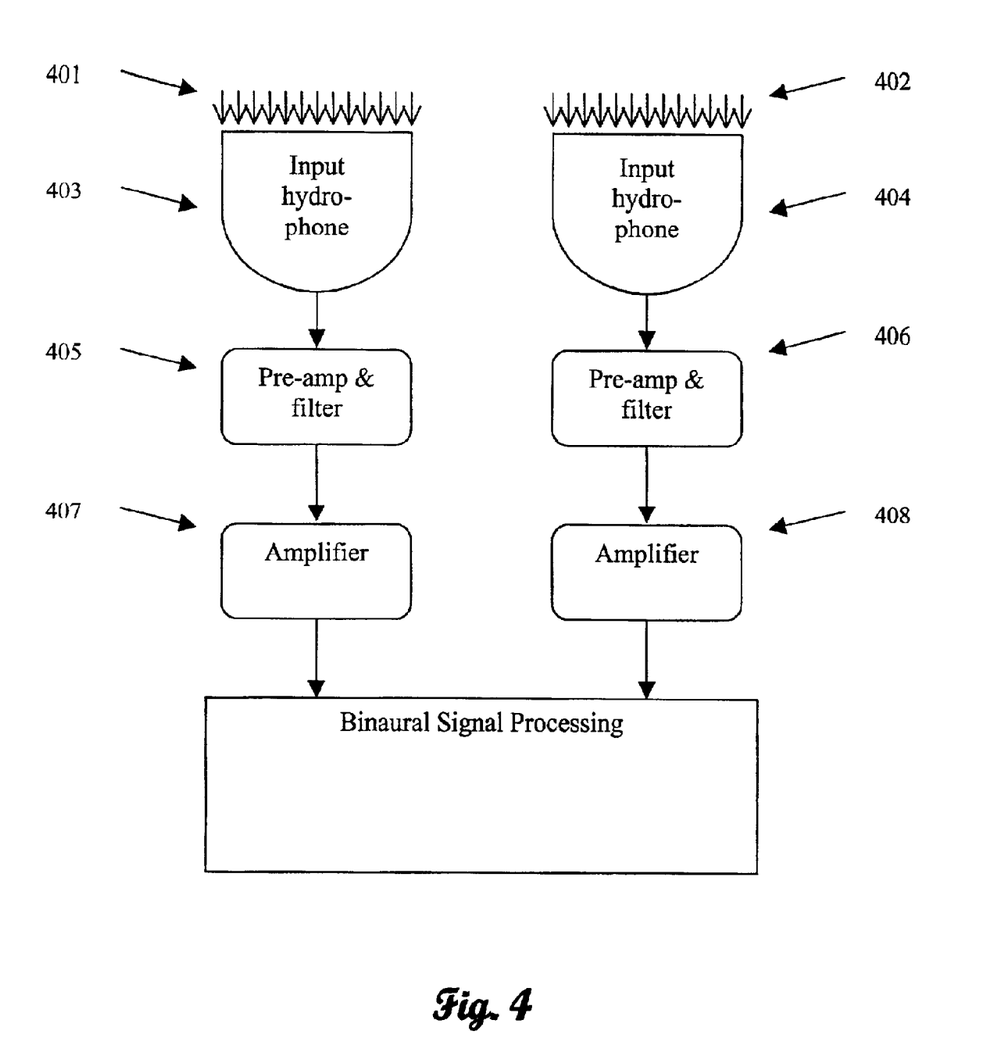
FIG. 4 illustrates the binaural receive paths in the Biomimetic Sonar device.

As shown in FIG. 4, acoustic energy (401, 402) received at the binaural hydrophones (403, 404) is amplified by a pre-amplifier (405, 406) and amplifier (407, 408) in each binaural channel and thereafter processed binaurally as described below. The Biomimetic Sonar invention computationally emulates the auditory processing of the dolphin, including the emulation of the displacement by acoustic energy of the basilar membrane in the dolphin cochlea, emulation of the generation of auditory neural signals corresponding to echoes from objects in the ensonified space, the creation of two- and three-dimensional acoustic images based on those neural signals, classification of those acoustic images, and comparison of those acoustic images with acoustic models of objects. The preferred embodiment of the Biomimetic Sonar invention uses left and right receive channels to provide binaural acoustic imaging, but multiaural (three or more hydrophone/pre-amplifier/amplifier/ cochlear processor/envelope processor chains) embodiments provide certain advantages, as described below.

The transmitter (output hydrophone) of the Biomimetic Sonar, when optionally connected to a transmit/receive ("T/R") switch and a third receive channel like one described above (403, 405, 407, plus cochlear and envelope processors connected in the manner of those of the binaural channels) can operate with the binaural channels to provide three channels of echolocation information to use in the generation of acoustic images. In this optional configuration, the output hydrophone is connected in rapid alternation to the transmit signal generation channel (301, 302) and the third receive channel. The T/R alternation is normally controlled by the object recognition processor, but can be controlled by one of the other processors, as described below. Additional channels of information increase the accuracy of the two- and three-dimensional models of objects in the ensonified space. The transmitter beam width is slightly narrower than the beam width of the receiving hydrophones, just as the beamwidth from a dolphin projector is slightly narrower than the receiving beamwidth. Echoes detected by the receiving hydrophones are processed using a computational model of the dolphin's cochlea. After a discussion of the theory of the Biomimetic Sonar, the system and method used to implement the theory will be described.

The cochlea plays a critical role in auditory processing in mammals, transforming soundwave patterns into spatially distributed patterns of motion on the basilar membrane within the cochlea and then into neural signals that are transmitted to the brain. The motion of the oval window of a dolphin "eardrum" induces a traveling wave along the basilar membrane. The wave causes an oscillation or displacement of regions of the membrane in a frequency-dependent pattern. Displacement of the basilar membrane deforms the inner hair cells, causing them to transmit neural signals to the ganglion cells whose axons form the fibers of the eighth nerve. Each point along the basilar membrane can be described, therefore, as a bandpass mechanical filter. A key issue in such models is the width and spacing of the filters that model the motion of the basilar membrane.

Figure 5:
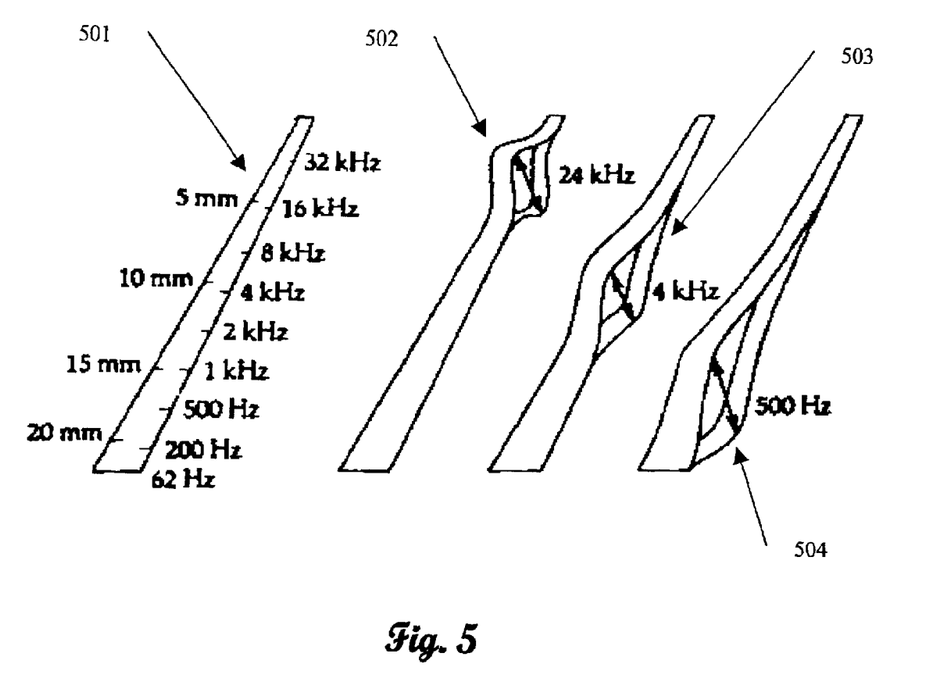
FIG. 5 illustrates the human basilar membrane, unrolled.

As shown in FIG. 5, the properties of a basilar membrane (501) are determined by its mass and stiffness. The basilar membrane extends from the margin of the bony shelf of the cochlea to the outer wall and supports the organ of Corti. High frequencies produce their maximum displacement (502) in the basilar membrane located near its base, middle frequencies produce their maximum displacement (503) near the middle of the membrane, and low frequencies produce their maximum displacement (504) near the apex. The Biomimetic Sonar models the mechanical characteristics of the basilar membrane by using a bank of gammatone filters, the bandwidth of which varies in proportion to the center frequency.

The gammatone filter bank is a functional model of the basilar membrane in the mammalian cochlea. Each filter in the filter bank can be expressed by the equation:

$$gt(x,t) = a(x) t^{(n-1)} e^{-2\pi b(x)t} \cos[2\pi f_c(x)]t + \phi$$

where x is the position along the basilar membrane of the cochlea, $f_c(x)$ is the center frequency of the auditory filter corresponding to x, b(x) is a parameter that mainly determines the duration of the impulse response and bandwidth of the filter at the position x, n is the order of the filter and determines the slope of the filter skirts, a(x) is the amplification at position x and $\phi$ is a phase constant The parameters b(x) and a(x) are chosen to create roex(p) filter shapes for frequencies appropriate to the frequency range of hearing in dolphins. The number of filters in the filter bank can be determined by first choosing the frequency range of interest, which determines the minimum and maximum values of x, and then selecting the incremental value of x to use. By the appropriate choice of x-increments, a filter bank is developed from the gammatone equation that models the frequency detection and processing capabilities of the dolphin cochlea.

Figure 6:
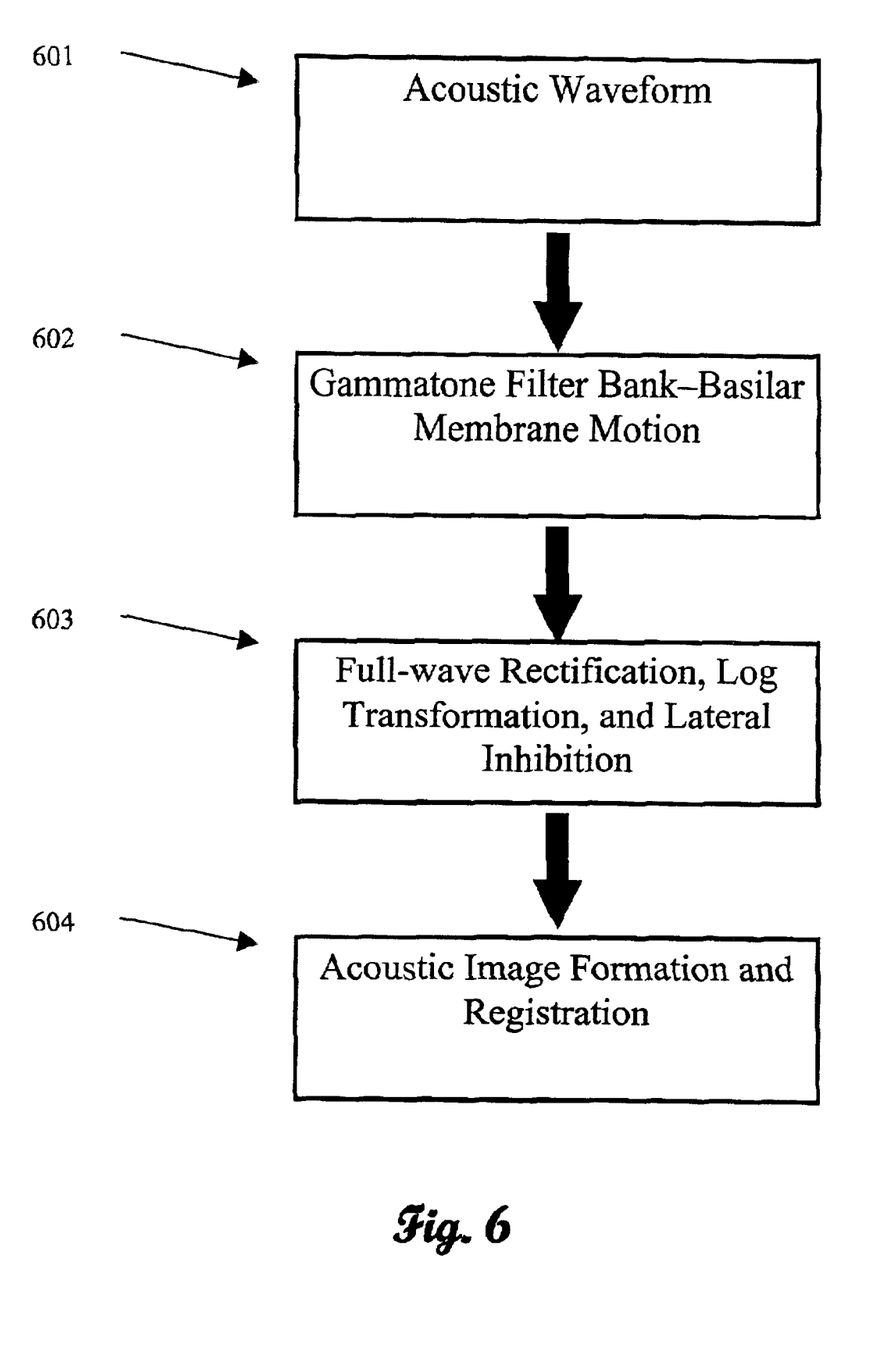
FIG. 6 is a flowchart of the emulation of mammalian auditory processing.

As shown in FIG. 6, the steps used in the Biomimetic Sonar emulate the steps of dolphin auditory processing. Acoustic energy is received as a sound pressure waveform (601) and converted into an analog electrical signal. The gammatone filter bank (602) processes the signal to determine the temporal-frequency characteristics of an echo waveform, thereby emulating the basilar membrane of the dolphin. After full-wave rectification, log transformation, and lateral inhibition (603), as explained below, an acoustic image is formed and registered (604), as explained below.

When an echo signal is fed to the gammatone filter bank, the output of each filter will have a time structure or waveform that has the same center frequency as the center frequency of the filter. The envelope of the time waveform is then determined by taking the "real" (from a complex variable perspective) output signal and transforming it into an "analytic" or complex signal having real and imaginary parts. The magnitude of the analytic signal is the envelope of the signal. The real signal output of the filter is rectified and transformed (603) into an analytic signal by adding the Hilbert transform of the signal to itself, where the Hilbert transform portion becomes the imaginary part of the analytic signal.

The mechanical characteristics of the basilar membrane transducer are represented as a bank of 78 gammatone filters. Characteristics of these filters correspond to the estimated stiffness and resonance characteristics of the corresponding locations on the basilar membrane. In the range of $3 \leq n \leq 5$, the shape of the gammatone filter is like that of the roex(p) filter. The equivalent rectangular bandwidth of the filter (ERB) is:

$$ERB = 24.75(4.37 f_c/1000+1).$$

When the order of the filter (n) is 4, b is 1.019 ERB, and the −3 dB bandwidth of the filter is 0.887 ERB. That is, when the power passed through a gammatone filter is set to be equal to that of a rectangular filter with gain one, then the bandwidth of the gammatone filter is 0.887 of the bandwidth of the equivalent rectangular filter.

Figure 7:
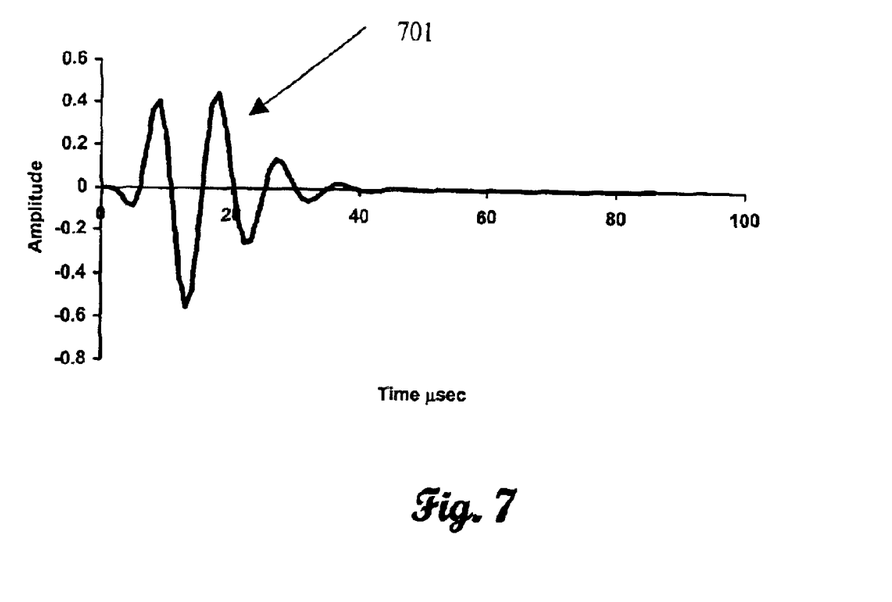
FIG. 7 illustrates the gammatone filter in the time domain.
Figure 8:
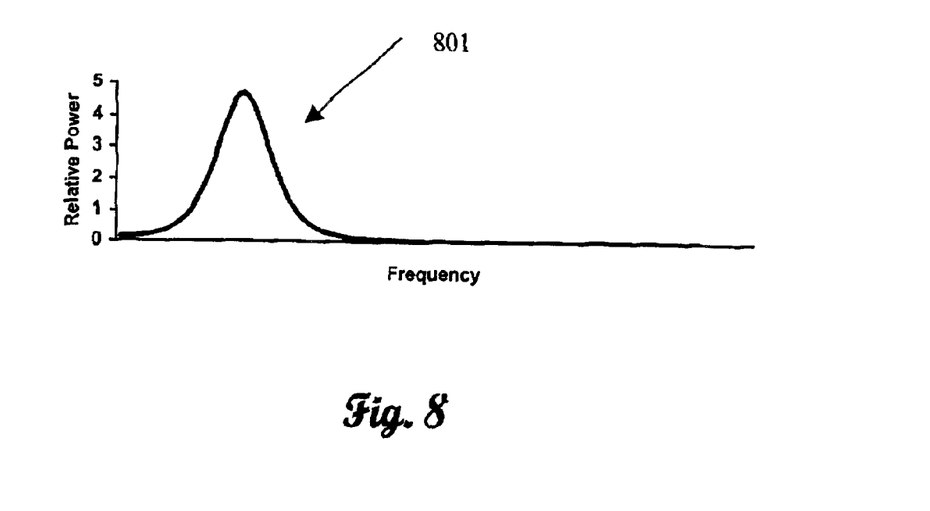
FIG. 8 illustrates the spectrum of the gammatone filter.

As shown in FIGS. 7 and 8, the impulse response of a gammatone filter in the time domain (701) and its corresponding spectrum (801) describe the characteristics of one of the gammatone filters used to produce the time-frequency representation of an echo. Passing an echo signal through a gammatone filter and determining the envelope of each filter output produces a time domain representation of the echo corresponding to the center frequency and bandwidth of the gammatone filter. Temporal information in the form of "highlight" spacing or separation (i.e., information that can be processed to reveal the surface and internal structures of ensonified objects) can be obtained by determining the time difference between the peaks in the envelope of each filter output. Passing an echo signal through a bank of gammatone filters and determining the envelope of each filter output produces a time-frequency representation of the echo.

Gammatone filters have demonstrated effectiveness in hearing and speech perception by humans and have the ability to characterize impulse-response data in the manner suggested by physiological studies of the primary auditory nerve fibers of the cat, as well as revcor data from auditory filtering studies of cats. In the Biomimetic Sonar, the bandpass and filter shape of the gammatone filters can be dynamically changed, which is advantageous in optimizing an acoustic image. The same power/frequency distribution (801) typically occurs at each passband in a gammatone filter bank.

The fundamental design parameter in modeling the basilar membrane motion stage is the placement of the centers of each filter along the length of the basilar membrane, which also determines the passband of each filter. The filter center frequencies used in Biomimetic Sonar invention are selected based on the thickness and stiffness of the dolphin's basilar membrane, on maps of ganglion-cell densities, and on audiometric properties.

The computational model of the dolphin cochlea calculates the center frequency of each channel $f_c$ in the gammatone filter as a function of the cumulative proportion of ganglion cells in the dolphin cochlea.

$$f_c = 158200 - 5.39 + 0.0000669^2 - 0.000000000293 G^3$$

$$G = 90030 \frac{c}{N}$$

Figure 9:
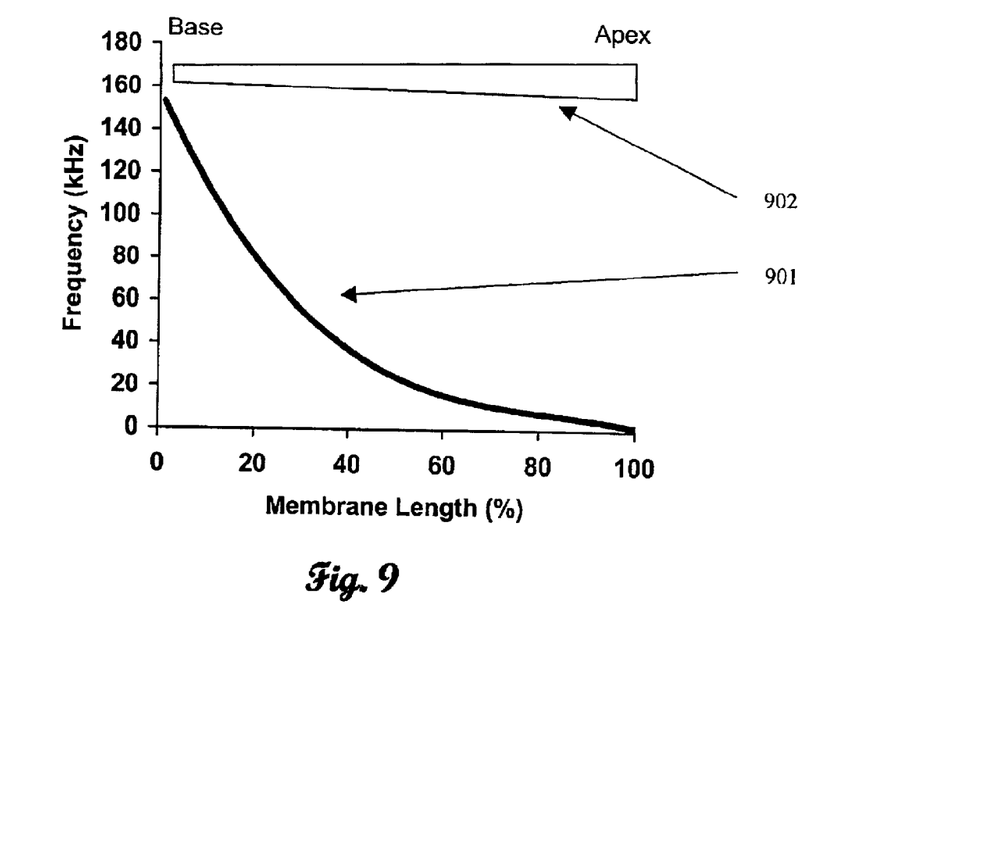
FIG. 9 illustrates the center frequency of the gammatone filters as a function of membrane position.

As shown in FIG. 9, for each channel, c, of the N channels in the Biomimetic Sonar determined according to the preceding equation, the center frequency (901) of the filter for that channel corresponds to a position along basilar membrane (902) and is a function of the cumulative proportion of ganglion cells, G. There are an estimated 90,030 ganglion cells in the dolphin's cochlea. A neural pattern is determined as a function of the computed basilar membrane motion. Signals in the Biomimetic Sonar are processed in 500 $\mu$sec segments. A 500 $\mu$sec waveform is presented to and convolved with each filter to produce a channel (c) by time (t) pattern of basilar-membrane position corresponding to a time-frequency representation.

In the dolphin cochlea, displacement of the basilar membrane triggers the neural activation of hair cells. Hair cells translate the movement of the basilar membrane into neural signals. The output of the hair cells as modeled in the Biomimetic Sonar uses the Meddis model. The Meddis model computes the release of neural transmitter into the relevant synaptic junction. In in vivo neurons, the amount of available neurotransmitter corresponds to the spike rate of the post-synaptic cell. In the Biomimetic Sonar, however, only a limited number of hair cells are emulated (i.e., the 78 gammatone filters in a gammatone filter bank). In the Biomimetic Sonar, similar levels of temporal resolution do not depend on spikes per second, but on total levels of neurotransmitter released, i.e., simulated neurotransmitter levels generated by a given gammatone filter are proportional to the temporal response of the modeled cells.

The output of the emulated basilar membrane motion ($Basps_{c,t}$) is sent to a neural activation module (603 in FIG. 6), which rectifies and log transforms the signal for each gammatone filter output channel, i.e., a frequency band, and each time point:

$$Cochpat_{c,t} = \log(1 + abs(Baspos_{c,t}))$$

Lateral inhibition is then used to sharpen the representation in both the time and the frequency dimensions. Lateral inhibition is a universal mechanism in the mammalian nervous system. A simplified single-pass, feed-forward inhibition is used in the preferred embodiment, but more sophisticated inhibition models can be used, such as "Difference of Gaussians" filtering. In feed-forward inhibition, the inhibition feeds only from $Cochpat_{c,t}$ forward to a $NAP_{c,t}$ (called herein the neural activity pattern ("NAP")) computed by the neural activation module (603 in FIG. 6), and only forward in time. Lateral inhibition is given by:

$$Inhib_{g,\tau} = e^{-0.05\ g^2} \cdot e^{-0.15\tau^2}$$

$$\tau < 0$$

$$-5 \leq g \leq 5$$

The five channels (g) above and below the frequency of the channel being represented contribute inhibition. Inhibition is also received from the preceding activations present in the Cochpat with the amount of inhibition decreasing exponentially as a function of the temporal distance ($\tau$). The activation (the computed output of the emulated neurons in response to an input signal) of a NAP is the sum of the activity present at the corresponding point in the Cochpat and the inhibition received from nearby points. Inhibition is computed by multiplying point for point, the inhibitory pattern, $Inhib_{g,\tau}$ times the $Cochpat_{c,t}$, where $\tau$ is time relative to t and measured in the same units. Hence the inhibition extends backward in time from the point being represented, with successively more temporally distant points having less inhibitory influence.

Figure 10:
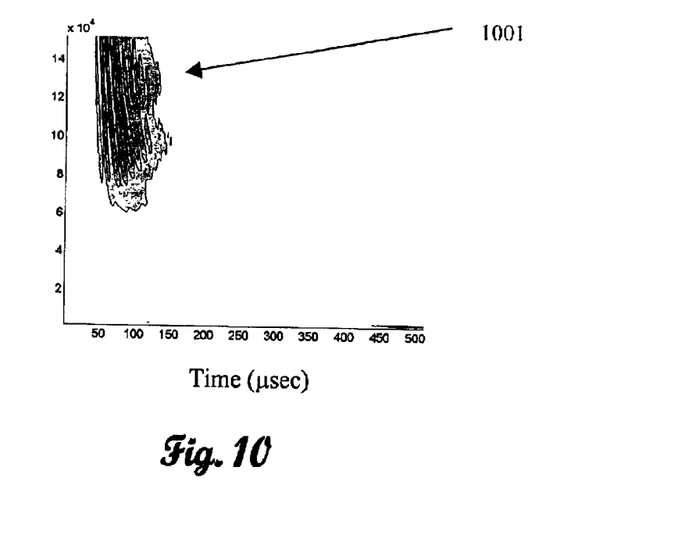
FIG. 10 illustrates an auditory image.

As shown in FIG. 10, an accumulation over time (x-axis), frequency (y-axis), and amplitude (grey scale density) information corresponds to a specific echo (1001). In FIG. 10, the grey scale density represents the intensity of an illustrative signal at a specific time and frequency. Each neural activation pattern is then copied into an "auditory image module" (604 in FIG. 6) that stacks the neural activation patterns resulting from a sequence of echoes into a single stable representation. An auditory image is an image in the sense that it is a two-dimensional representation of frequency and time that provides a representation of the psychophysical properties of the resulting echoes. In reality, it is a mathematical object that reflects the intensity of the signal in each frequency "bin" as a function of time. The use of the word "image", in this instance, is not intended to imply any specific picture-like qualities of the representation or a direct representation of object features. Auditory images of the same ensonified area obtained from different physical viewpoints (aspects) can be assembled to create a three dimensional auditory image, i.e., frequency by time by location.

To construct an auditory image, each NAP is scanned for highlights. The first highlight above a criterion threshold causes the contents of the NAP to be copied to the auditory image and added to the representation already there. The temporal locus of this highlight functions as a trigger and an alignment point so that the location of the highlight always maps to the same position in the auditory image, with reference Time 0 being the start of the relevant pulse of transmitted acoustic energy from the transmitter of the Biomimetic Sonar device. Points in the NAP that do not correspond to points in the auditory image (e.g., because they are due to momentary noise) tend to cancel out over time, emphasizing features that are common over successive echoes.

The result of this processing is a time-frequency distribution that can be used for further neural network processing. Each auditory image contains detailed temporal information about the structure of the echo as well as a broad spectral estimation, and contains more detailed phase information both within and between spectral channels compared with current models of phase information in human auditory processing.

Lateral inhibition can also be achieved by transmission of each NAP through a set of partially overlapping "receptive fields" made up of 2-dimensional "Difference of Gaussians" (DOG) filters. DOG filter processing, or lateral inhibition, reduces the number of points that needs to be processed. The DOG filters have at least 3 different widths for echo features at three different scales. Because these filters overlap, they can potentially convey just as much information about the characteristics of the echo as a full representation, but do so with many fewer processing elements. Reducing the number of elements or highlights to be processed increases processing throughput Increased throughput is important if the Biomimetic Sonar is used for navigation or real-time process control purposes.

A target that is ensonified with a broadband pulsed signal such as a dolphin-like (i.e., biomimetic) sonar signal will have its own time-frequency characteristics, or "highlights". The same target will generate different time-frequency characteristics when ensonified from different aspects. Such time-frequency characteristics are independent of the distance of the sonar from the target, assuming a sufficiently high signal-to-noise ratio. Therefore, multiple, related time-frequency characteristics of a specific target can be obtained by ensonifying that target in many different aspects. The echo characteristics (acoustic images produced by the Biomimetic Sonar) taken as a whole form a template of a given ensonified object. Furthermore, each of the binaural (or more) receive channels will have slightly different time-frequency characteristics, providing more information and a better characterization of a target as to surface texture, structural relationships, thickness, etc. Each auditory image is further processed by the neural network in the object recognition processor to produce an "acoustic image".

A library of acoustic images of targets ("object templates") of interest is built by a ensonifying and classifying the acoustic images of known objects using the Biomimetic Sonar. The library of acoustic images, or object templates, is stored in a neural network or separately in a mass storage devices integrated within the case of the Biomimetic Sonar device and/or linked to it via telecommunications channels. A Biomimetic Sonar examining an unknown target will take the time-frequency information from a specific aspect and compare this information against object templates in the library. If the unknown target is examined at different aspects, then many comparisons can be made, including 2.5- or 3-dimensional comparisons. A 2.5 dimensional depiction is known in the art of object recognition for circumstances in which the observer has more than 2-dimensional information, but less than complete 3-dimensional information about object structure. If the comparisons match the characteristics of one of the object templates, then an unknown target can be identified. If the comparison does not provide a good match, then a rank-ordered probability table can be generated specifying the probability of the unknown object being one of the objects stored in the object template library. The process of comparing signals from unknown ensonified objects with templates in the library is preferably done with an artificial back-propagation neural network. In the preferred embodiment, the library of object templates is implicit in the learned connection weights of the neural network in the object recognition processor. The neural network is trained by presenting the object templates (acoustic images of known objects) as inputs to the network along with a known classification of the template as the desired network output (one output for each class of target). Such neural networks can store a large number of candidate templates during the comparison process and can produce classifications with high accuracy at high speed. Because of the continuous properties of neural network computing, the preferred embodiment of the invention stores acoustic images in the neural net connections and automatically produces ranked classifications, the probability of which correspond to the strength of the neural network's output for the specific classification. In an alternative embodiment, a commercial, off the shelf database (e.g., MySQL, available at www.mysql.com) can be used to store the templates. Retrieval is facilitated by indexing key highlights in each template.

Figure 11:
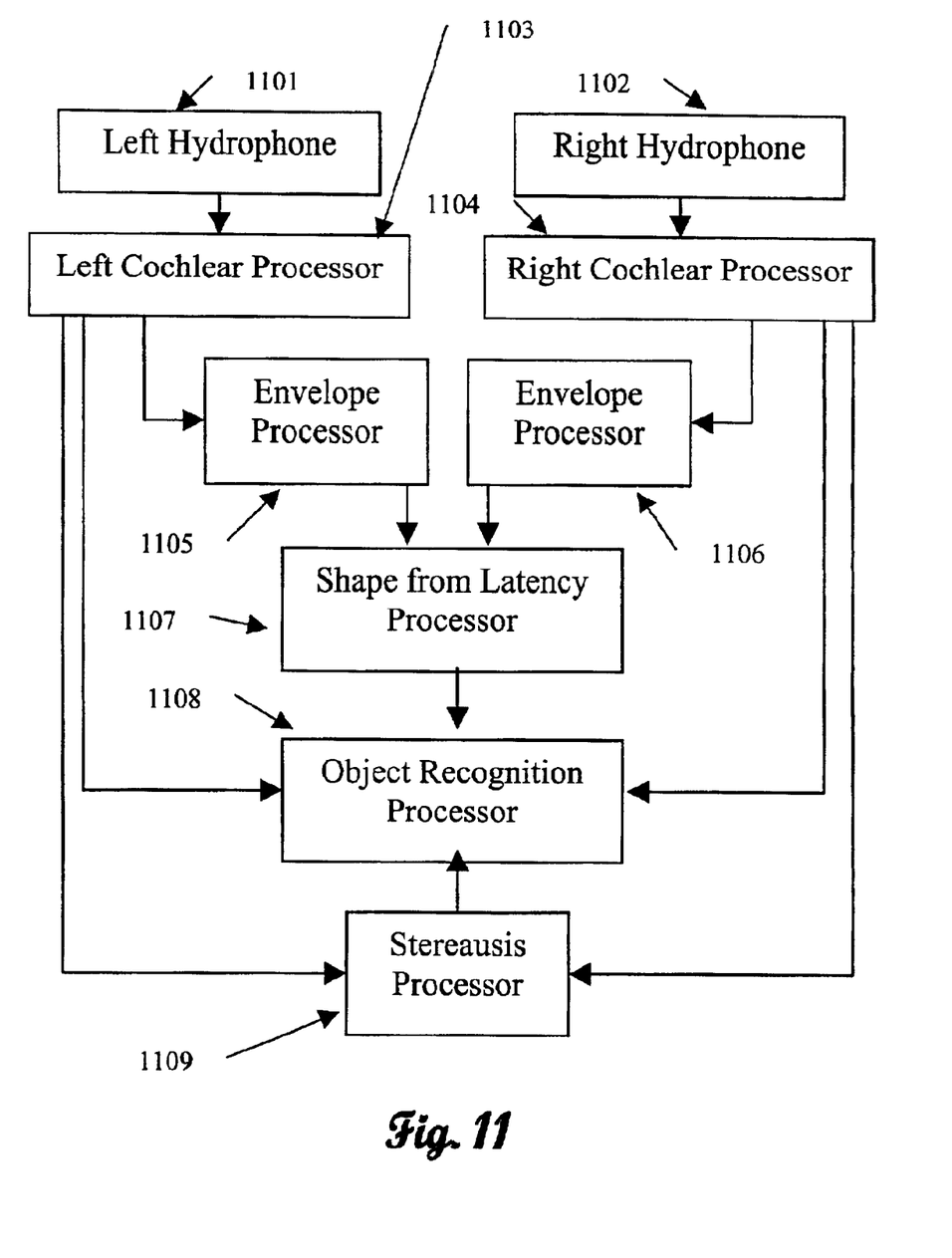
FIG. 11 illustrates the Biomimetic Sonar signal processing.

As shown in FIG. 11, the echoes received from the binaural (or multi-aural) hydrophone array are analyzed both individually and by differential comparison. The preferred signal analysis procedure using a binaural hydrophone array consists of feeding the echoes received by the left and right hydrophones (1101, 1102) into a left cochlear processor and a right cochlear processor (1103, 1104), respectively. Each cochlear processor comprises a gammatone filter bank with adjustable parameters, a means of log transformation, and at least three outputs. After log-transformation of the gammatone filter bank output, a given cochlear processor feeds the inputs of an envelope processor (1105, 1106), an object recognition processor (1108), and a stereausis processor (1109).

Each envelope processor (1105, 1106) determines the temporal envelope of the signal using the Hilbert transform, as described above. The "shape from latency" processor (1107) uses temporal information contained in the echo structure obtained from different aspects of a target to compute shape, textural, and structural characteristics of a target. More distant parts of an object reflect echoes later than closer parts do, and different shapes of an object reflect frequencies differently. Both the time profile and frequency profile usually change with different aspects, and as a function of distance from the object. The time between pulses of acoustic energy from the transmitter and highlights in a received and processed signal gives information about the range of the targets that generated those highlights by reflecting the transmitter's acoustic beam. Range information (echo delay) is also used as a factor in determining the dimensions of targets.

The streausis processor (1109) is a simple neural network that combines spectral information from the two cochleae according to the following equation:

$$c_{i,j}(t)=[x_i(t)+y_j(t)]^2$$

Each element ($c_{i,j}$) of the stereausis processor (1109) receives an input from an output of the left cochlear processor (1103) and from an output of the right cochlear processor (1104), both at time t. All combinations of gammatone channels in a cochlear processor output can be represented in the stereausis processor, but, the preferred embodiment of the invention uses only the main diagonal (i.e., when i=j according to the presented equation) connecting corresponding channels of the two gammatone filter banks in the cochlear processors (1103, 1104).

Figure 12:
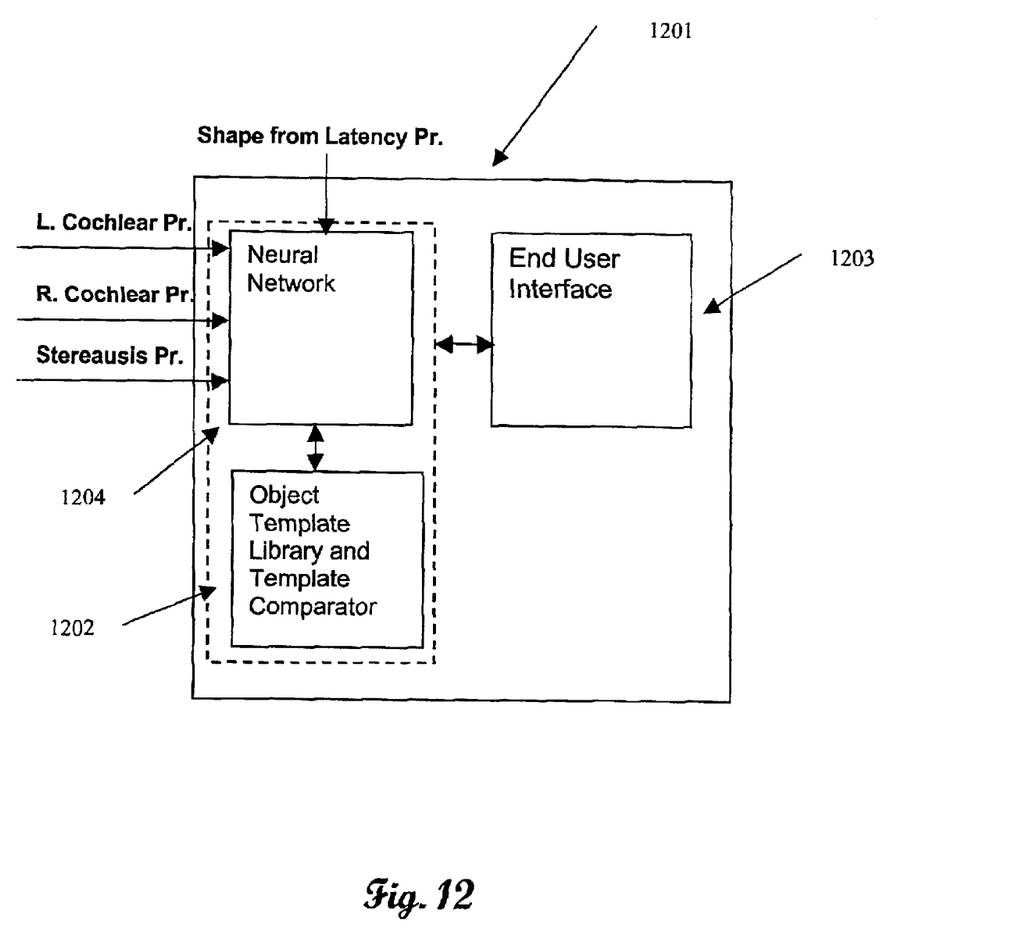
FIG. 12 illustrates the object recognition module.

As shown in FIG. 12, the outputs of the envelope processor, the stereausis processor, and each cochlear processor converge in a neural network (1204) contained in the object recognition processor (1201) The neural network (1204) fuses the information from the processors feeding it and interacts with the object template library/template comparator (1202) to classify the target. The dotted line around the neural network (1204) and the object template library/template comparator (1202) indicates that, in the preferred embodiment, they are combined in a single neural network. In an alternative embodiment, separate mass storage is used for the object template library, and the template comparator can either remain part of the neural network (1204) or also be separate. The template comparator serves candidate templates to the neural network (1204) and the neural network determines the probable identity on an ensonified object. The object recognition processor uses the full spectral information available from each cochlear processor's time-frequency output plus the outputs of the shape from latency processor and the stereausis processor to extract cues to object identity. Each cochlear time-frequency output is processed in the object recognition processor to yield data about the distance, size, texture, and shape of a target; these data are similar to, and sometimes redundant with, data produced by the envelope processor and shape from latency processor. The object recognition processor also outputs a time-frequency domain representation of the signal (e.g., in the form of notches in the spectrum) as a bitstream. The time-frequency domain output can contain information about the material from which the target is constructed, and the texture of the target. The algorithms used for spectral processing of submerged targets are also effective at identifying buried targets. An object template library and template comparator (1202) is integrated with the object recognition processor in a self-contained embodiment of a Biomimetic Sonar device. Larger template libraries, more powerful object recognition processors, and more powerful template comparators can be linked to a Biomimetic Sonar device by data communications channels.

An end user interface (1203) in the object recognition processor receives neural network (1204) output in bitstream form (time-frequency characteristics with or without DOG filtering) for farther data processing, and can be presented in graphic displays for human end users. End users of the output bitstream can also be analytic and other processors in collocated or networked computers. More powerful object recognition modules can generate 2.5- and 3-dimensional displays of ensonified areas in real time for navigation, mine-sweeping, or process control purposes.

Physical movement of a Biomimetic Sonar system at various velocities relative to a target further enhances the information that can be extracted about a target. Rather than physically moving a single transducer system through a path, multiple transducer units can be positioned. More than two or three hydrophones (either as part of a single Biomimetic Sonar device or as an array of linked hydrophones) can be networked by data communications and used concurrently to provide more information about a target, navigation, or process being controlled, or to provide a more rapid identification of an ensonified object, or to cover a greater ensonified area. With a frequency control system that prevents concurrent use by more than one transmitter of a given frequency band, two or more transmitters can be used concurrently to ensonify the same area. The object recognition outputs, as well as the "raw" cochlear outputs, from multiple transducer systems can be combined using methods similar to the combination in radio astronomy of the outputs of receivers in multiple locations. Although neural networks are the preferred method of combining the cochlear, shape from latency, and stereausis processor outputs in a given object recognition module, alternative computational models can be used.

The analog and digital processing required by the Biomimetic Sonar invention can be performed by separate processors in a single computer or by a plurality of networked computers. In the one embodiment of the invention, the object recognition processor dynamically changes filter center frequencies, filter bandpass, filter shape, and number of filters in each gammatone filter bank to optimize the acoustic images produced. Each processor in the Biomimetic Sonar invention contains an artificial neural network, a digital communications path and device for control of the neural network parameters by a software application. At least one processor, normally the object recognition processor (1108 in FIG. 11), runs an operating system and software applications to control the Biometric Sonar and to provide a user interface (1203 in FIG. 12). In an alternative embodiment, one or more of the analog neural networks can be replaced by a digital signal processor simulating a neural network.

No other sonar has the biomimetic signal processing features and the multi-channel features of the Biomimetic Sonar invention. The Biomimetic Sonar system and method can also be used for undersea navigation and process control, e.g., undersea mining, mapping, and rescue operations. An atmospheric version of the Biomimetic Sonar can be used in atmospheric environments where lighting is unavailable or undesirable.

Those skilled in the art also will readily appreciate that many modifications to the Biomimetic Sonar invention are possible within the scope of the invention. Accordingly, the scope of the invention is not intended to be limited to the preferred embodiments described above, but only by the appended claims.

We claim:

1. A method of using a sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, for process control in atmospheric environments where lighting is unavailable, comprising:

ensonifying an atmospheric field with acoustic pulses from the transmitter, processing the pulse echoes received by the receiver, and generating acoustic images to facilitate process control in the ensonified field.

2. A sonar system, comprising:

a transmitter and receiver that use acoustic signal waveforms and processing similar to those used by dolphins for echolocation in which acoustic pulses are radiated by the transmitter, two or more channels of pulse echoes are received by the receiver and each channel processed through a cochlear processor and an envelope processor, and the outputs of such channels are further processed by a shape from latency processor, a stereausis processor, and an object recognition processor to generate acoustic images and probable identification of objects in the ensonified field.

3. A sonar system, comprising:

a transmitter and receiver that use acoustic signal waveforms and processing similar to those used by dolphins for echolocation in which acoustic pulses are radiated by the transmitter, two or more channels of pulse echoes from one or more ensonified objects are received by the receiver and each channel is processed through a cochlear processor and then an envelope processor, the output of each envelope processor is further processed by a shape from latency processor, a second output of each cochlear processor is processed by a stereausis processor, a third output of each cochlear processor is processed by a object recognition processor that contains a library of object templates, a template comparator, an end user interface, and a neural network, and in which object recognition processor the echolocation data describing one or more ensonified objects that is output from the shape from latency processor, the two or more cochlear processors and the stereausis processor are processed by the neural network to generate acoustic images, the generated images are compared by the template comparator with object templates in the object template library for identification, and probable identifications of the one or more ensonified objects are provided through the neural network to the end user interface.

4. The system of claim 2 or 3, in which the transmitter and receiver are housed in an enclosure, a transmitter hydrophone and two receiver hydrophones are located on a front panel of the enclosure and in contact with an ensonified medium, the transmitter hydrophone center is located approximately 10 cm above the centerline of, and midway between, the two receiver hydrophones, and the two receiver hydrophones are centered approximately 13 cm apart.

5. The system of claim 2 or 3, in which the acoustic pulses transmitted by transmitter are replicas of the projector modulation, beamwidth, and waveforms used by *Tursiops truncatus*.

6. The system of claim 2 or 3, in which echoes of ensonified objects in the field of the transmitter are received by the receiver and auditory processing in the receiver closely approximates that used by *Tursiops truncatus*.

7. The system of claim 2 or 3, in which echoes of ensonified objects in the field of the transmitter are received by the receiver and processing in the receiver includes the generation of neural signals and processing by a neural network.

8. The system of claim 2 or 3, in which echoes of ensonified objects in the field of the transmitter are received by the receiver and processing in the receiver includes the generation of two and three dimensional acoustic images of the ensonified object.

9. The system of claim 2 or 3, in which a hydrophone used by the transmitter is connected through a switch to a third receive channel in the receiver, the use of the transmitter hydrophone is switched between a transmit channel during transmission of acoustic pulses for radiation by the transmitter and the third receive channel during the time between the transmission of acoustic pulses, echoes of ensonified objects in the field of the transmitter are received by the receiver, and three channels of processing are used in the receiver.

10. The system of claim 2 or 3, in which echoes of ensonified objects in the field of the transmitter are received by the receiver and processing in the receiver characterizes an ensonified object's surface, structure, thickness, and geometry by ensonifying the object from a plurality of aspects and processing the echoes of the object.

11. The system of claim 2 or 3, in which processing in the receiver is performed by neural networks.

12. The system of claim 2 or 3, in which two or more of such systems are linked by data communications and used concurrently to provide more information about an ensonified object, navigation, or process being controlled, to provide a more rapid identification of an ensonified object, or to cover a greater ensonified area.

13. The system of claim 2 or 3, in which two or more of such systems are linked by data communications and a transmitter frequency control system that prevents concurrent use by more than one transmitter of a given frequency band.

14. A method of using the system of claim 2 or 3, to identify submerged objects, comprising:
    ensonifying an underwater field with acoustic pulses from the transmitter,
    processing the pulse echoes received by the receiver, and
    generating acoustic images and probable identification of objects in the ensonified field.

15. A method of using the system of claim 2 or 3, to identify objects buried underwater, comprising:
    ensonifying an underwater field, including a bottom surface of the body of water, with acoustic pulses from the transmitter,
    processing the pulse echoes received by the receiver, and
    generating acoustic images and probable identification of buried objects in the ensonified field.

16. A method of using the system of claim 2 or 3, for underwater navigation, comprising:
    ensonifying an underwater field with acoustic pulses from the transmitter,
    processing the pulse echoes received by the receiver, and
    generating acoustic images to facilitate navigation in the ensonified field.

17. A method of using the system of claim 2 or 3, for underwater process control, comprising:
    ensonifying an underwater field with acoustic pulses from the transmitter,
    processing the pulse echoes received by the receiver, and
    generating acoustic images to facilitate process control in the ensonified field.

18. A method of using the system of claim 2 or 3, for underwater rescue or salvage operations, comprising:
    ensonifying an underwater field with acoustic pulses from the transmitter,
    processing the pulse echoes received by the receiver, and
    generating acoustic images to facilitate rescue or salvage operations in the ensonified field.

19. A method of using the system of claim 2 or 3, for process control in atmospheric environments where lighting is unavailable, comprising:
    ensonifying an atmospheric field with acoustic pulses from the transmitter,
    processing the pulse echoes received by the receiver, and
    generating acoustic images to facilitate process control in the ensonified field.

20. The system of claim 2 or 3, in which echoes of ensonified objects in the field of the transmitter are received by the receiver and binaural processing in the receiver includes the step of emulating the displacement by acoustic energy of a basilar membrane in *Tursiops truncatus* by the use of a gammatone filter bank in a left cochlear processor and a right cochlear processor.

21. The system of claim 2 or 3, in which echoes of ensonified objects in the field of the transmitter are received by the receiver and processing in the receiver includes the step of emulating the displacement by acoustic energy of a basilar membrane in *Tursiops truncatus* by the use of a gammatone filter bank in a left cochlear processor and a right cochlear processor, and the bandpass and skirts of the gammatone filters in each gammatone filter bank are dynamically changed to optimize the acoustic image generated.

22. The system of claim 2 or 3, in which echoes of ensonified objects in the field of the transmitter are received by the receiver and processing in the receiver includes the steps in each cochlear processor of log transforming received signals, and adding the Hilbert transform of the signal to itself in each envelope processor, to construct envelopes of received signals that facilitate extraction of the temporal characteristics of a given echo.

23. The system of claim 2 or 3, in which echoes of ensonified objects in the field of the transmitter are received by the receiver and processing in the receiver includes selecting filter center frequencies, filter bandpass, filter shape, and number of filters in a gammatone filter bank in the cochlear processors to emulate the functioning of a basilar membrane in *Tursiops truncatus* and thereby to optimize the acoustic image generated.

24. The system of claim 2 or 3, in which echoes of ensonified objects in the field of the transmitter are received by the receiver and processing in the receiver generates acoustic images that contain detailed temporal information about the structure of the echo, broad spectral estimations, and detailed phase information for use within a processor in a receive channel and in combining signals from more than one processor.

25. The system of claim 2 or 3, in which echoes of ensonified objects in the field of the transmitter are received by the receiver and processing in the receiver employs lateral inhibition by transmission of a neural activation pattern in the cochlear processor through a set of partially overlapping receptive fields made up of 2-dimensional Difference of Gaussians filters.

26. The system of claim 2 or 3, in which echoes of ensonified objects in the field of the transmitter are received by the receiver and processing in the receiver compares an acoustic image of an ensonified object with object templates, provides one or more probability-weighted identifications of the ensonified object based on the closest one or more matches of the acoustic image with one or more object templates.

27. A sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, and in which the transmitter and receiver are housed in an enclosure, a transmitter hydrophone and two receiver hydrophones are located on a front panel of the enclosure and in contact with an ensonified medium, the transmitter hydrophone center is located approximately 10 cm above the centerline of, and midway between, the two receiver hydrophones, and the two receiver hydrophones are centered approximately 13 cm apart.

28. A sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, and in which the acoustic pulses transmitted by transmitter are replicas of the projector modulation, beamwidth, and waveforms used by *Tursiops truncatus*.

29. A sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, and, in which echoes of ensonified objects in the field of the transmitter are received by the receiver and auditory processing in the receiver closely approximates that used by *Tursiops truncatus.*

30. A sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, and in which echoes of ensonified objects in the field of the transmitter are received by the receiver and processing in the receiver includes the generation of neural signals and processing by a neural network.

31. A sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, and in which echoes of ensonified objects in the field of the transmitter are received by the receiver and processing in the receiver includes the generation of two and three dimensional acoustic images of the ensonified objects.

32. A sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, and in which a hydrophone used by the transmitter is connected through a switch to a third receive channel in the receiver, the use of the transmitter hydrophone is switched between a transmit channel during transmission of acoustic pulses for radiation by the transmitter and the third receive channel during the time between the transmission of acoustic pulses, echoes of ensonified objects in the field of the transmitter are received by the receiver, and three channels of processing are used in the receiver.

33. A sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, and in which echoes of ensonified objects in the field of the transmitter are received by the receiver and processing in the receiver characterizes an ensonified object's surface, structure, thickness, and geometry by ensonifying the object from a plurality of aspects and processing the echoes of the object.

34. A sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, and in which processing in the receiver is performed by neural networks.

35. A sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, and in which two or more of such systems are linked by data communications and used concurrently to provide more information about an ensonified object, navigation, or process being controlled, to provide a more rapid identification of an ensonified object, or to cover a greater ensonified area.

36. A sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, and in which two or more of such systems are linked by data communications and a transmitter frequency control system that prevents concurrent use by more than one transmitter of a given frequency band.

37. A method of using a sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, to identify submerged objects, comprising:

ensonifying an underwater field with acoustic pulses from the transmitter, processing the pulse echoes received by the receiver, and generating acoustic images and probable identification of objects in the ensonified field.

38. A method of using a sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, to identify objects buried under water, comprising:

ensonifying an underwater field, including a bottom surface of the body of water, with acoustic pulses from the transmitter, processing the pulse echoes received by the receiver, and generating acoustic images and probable identification of buried objects in the ensonified field.

39. A method of using a sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, for underwater navigation, comprising:

ensonifying an underwater field with acoustic pulses from the transmitter, processing the pulse echoes received by the receiver, and generating acoustic images to facilitate navigation in the ensonified field.

40. A method of using a sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, for underwater process control, comprising:

ensonifying an underwater field with acoustic pulses from the transmitter, processing the pulse echoes received by the receiver, and generating acoustic images to facilitate process control in the ensonified field.

41. A method of using a sonar system, comprising a transmitter and receiver that use acoustic signal waveforms and processing similar to those used by dolphins for echolocation in which acoustic pulses are radiated by the transmitter, two or more channels of pulse echoes are received by the receiver and processed to generate acoustic images and probable identification of objects in the ensonified field, for underwater rescue or salvage operations, comprising:

ensonifying an underwater field with acoustic pulses from the transmitter, processing the pulse echoes received by the receiver, and generating acoustic images to facilitate rescue or salvage operations in the ensonified field.

\* \* \* \* \*